(12) United States Patent
Boyd et al.

(10) Patent No.: US 8,218,811 B2
(45) Date of Patent: Jul. 10, 2012

(54) METHOD AND SYSTEM FOR VIDEO INTERACTION BASED ON MOTION SWARMS

(75) Inventors: Jeffrey Edwin Boyd, Calgary (CA); Quoc Ai Nguyen, Calgary (CA); Christian Johann Jacob, Canmore (CA); Gerald Hushlak, Calgary (CA)

(73) Assignee: UTI Limited Partnership, Calgary (CA)

( * ) Notice: Subject to any disclaimer, the term of this patent is extended or adjusted under 35 U.S.C. 154(b) by 1291 days.

(21) Appl. No.: 11/863,951

(22) Filed: Sep. 28, 2007

(65) Prior Publication Data

US 2009/0087032 A1  Apr. 2, 2009

(51) Int. Cl.
G06K 9/00 (2006.01)
G09G 5/00 (2006.01)
(52) U.S. Cl. .................................... 382/100; 345/619
(58) Field of Classification Search .......... 382/100–105, 382/181–231, 275–299
See application file for complete search history.

(56) References Cited

U.S. PATENT DOCUMENTS

| | | | |
|---|---|---|---|
| 3,934,202 A | 1/1976 | Missale | 455/501 |
| 3,946,329 A | 3/1976 | Caspari | 331/4 |
| 4,056,780 A | 11/1977 | Faulkner | 455/9 |
| 4,084,139 A | 4/1978 | Jakobe | 381/4 |
| 4,224,559 A | 9/1980 | Miller | 318/601 |
| 4,403,256 A | 9/1983 | Green et al. | 348/208.3 |
| 4,450,351 A | 5/1984 | Fraden | 250/221 |
| 4,467,356 A | 8/1984 | McCoy | 348/385.1 |
| 4,542,300 A | 9/1985 | Nagatomi | 307/112 |
| 4,595,879 A | 6/1986 | Lent et al. | 324/309 |
| 4,627,050 A | 12/1986 | Johnson et al. | 370/363 |
| 4,821,043 A | 4/1989 | Leavitt | 343/765 |
| 4,849,964 A | 7/1989 | van Baardewijk | 370/370 |
| 4,860,201 A | 8/1989 | Stolfo et al. | 712/11 |
| 4,932,612 A | 6/1990 | Blackwelder et al. | 244/207 |
| 4,975,926 A | 12/1990 | Knapp | 375/141 |
| 5,051,982 A | 9/1991 | Brown et al. | 370/381 |
| 5,109,414 A | 4/1992 | Harvey et al. | 725/135 |
| 5,138,455 A | 8/1992 | Okumura et al. | 348/565 |
| 5,212,550 A | 5/1993 | Park | 348/458 |
| 5,229,991 A | 7/1993 | Turner | 370/389 |
| 5,233,654 A | 8/1993 | Harvey et al. | 725/135 |
| 5,235,417 A | 8/1993 | Casavant et al. | 348/452 |
| 5,329,317 A | 7/1994 | Naimpally et al. | 348/620 |
| 5,335,277 A | 8/1994 | Harvey et al. | 380/242 |
| 5,426,637 A | 6/1995 | Derby et al. | 370/401 |
| 5,450,474 A | 9/1995 | Hoflinger | 455/461 |
| 5,513,854 A | 5/1996 | Daver | 700/91 |
| 5,523,800 A | 6/1996 | Dudek | 348/734 |
| 5,534,917 A | 7/1996 | MacDougall | 348/169 |
| 5,574,663 A | 11/1996 | Ozcelik et al. | 709/247 |

(Continued)

OTHER PUBLICATIONS

Sand, Peter, Teller, Seth; Particle Video: Long-Range Motion Estimation using Point Trajectories; MIT Conputer Science and Artificial Intelligence Laboratory, 2006.

(Continued)

*Primary Examiner* — Manav Seth
(74) *Attorney, Agent, or Firm* — Fulbright & Jaworski L.L.P.

(57) ABSTRACT

A system and method for generating a video display suitable for interaction with a public audience or group. The system comprises one or more video capture devices for capturing a scene, a module configured to extract one or parameters that describe a field of motion in the scene, and a module configured to generate a plurality of particles or a swarm of particles that are responsive or react to the motion field.

20 Claims, 5 Drawing Sheets

U.S. PATENT DOCUMENTS

| | | | |
|---|---|---|---|
| 5,596,373 A | 1/1997 | White et al. | 348/569 |
| 5,606,655 A | 2/1997 | Arman et al. | 345/440 |
| 5,611,000 A | 3/1997 | Szeliski et al. | 382/294 |
| 5,748,247 A | 5/1998 | Hu | 375/240.14 |
| 5,748,263 A | 5/1998 | Ball | 348/734 |
| 5,808,695 A | 9/1998 | Rosser et al. | 348/584 |
| 5,818,390 A | 10/1998 | Hill | 343/700 MS |
| 5,818,902 A | 10/1998 | Yu | 378/65 |
| 5,822,007 A | 10/1998 | Knee et al. | 348/416.1 |
| 5,830,069 A | 11/1998 | Soltesz et al. | 463/42 |
| 5,831,352 A | 11/1998 | Takei | 310/12.21 |
| 5,887,243 A | 3/1999 | Harvey et al. | 725/136 |
| 5,907,626 A | 5/1999 | Toklu et al. | 382/107 |
| 5,999,216 A | 12/1999 | Kaars | 375/240.01 |
| 6,021,468 A | 2/2000 | Arimilli et al. | 711/122 |
| 6,023,239 A | 2/2000 | Kovach | 342/357.44 |
| 6,046,773 A | 4/2000 | Martens et al. | 375/240.25 |
| 6,047,078 A | 4/2000 | Kang | 382/107 |
| 6,088,349 A | 7/2000 | Zumkeller | 370/345 |
| 6,160,586 A | 12/2000 | Justiss et al. | 348/452 |
| 6,163,575 A | 12/2000 | Nieweglowski et al. | 375/240.16 |
| 6,199,709 B1 | 3/2001 | Rossler | 213/75 D |
| 6,212,235 B1 | 4/2001 | Nieweglowski et al. | 375/240.08 |
| 6,236,737 B1 | 5/2001 | Gregson et al. | 382/103 |
| 6,285,711 B1 | 9/2001 | Ratakonda et al. | 375/240.16 |
| 6,370,196 B1 | 4/2002 | Griessl et al. | 375/240.16 |
| 6,421,067 B1 | 7/2002 | Kamen et al. | 715/719 |
| 6,434,562 B1 | 8/2002 | Pennywitt et al. | 1/1 |
| 6,468,265 B1 | 10/2002 | Evans et al. | 606/1 |
| 6,480,543 B1 | 11/2002 | Pau et al. | 375/240.16 |
| 6,487,171 B1 | 11/2002 | Honig et al. | 370/235 |
| 6,507,617 B1 | 1/2003 | Karczewicz et al. | 375/240.16 |
| 6,573,912 B1 | 6/2003 | Suzuki et al. | 715/757 |
| 6,580,810 B1 | 6/2003 | Yang et al. | 382/103 |
| 6,583,624 B1 | 6/2003 | Muthupillai et al. | 324/309 |
| 6,594,629 B1 | 7/2003 | Basu et al. | 704/251 |
| 6,625,333 B1 | 9/2003 | Wang et al. | 382/300 |
| 6,628,946 B1 | 9/2003 | Wiberg et al. | 455/434 |
| 6,636,524 B1 | 10/2003 | Chen et al. | 370/418 |
| 6,636,619 B1 | 10/2003 | Zhang et al. | 382/118 |
| 6,638,221 B2 | 10/2003 | Abe et al. | 600/437 |
| 6,647,131 B1 | 11/2003 | Bradski | 382/107 |
| 6,654,483 B1 | 11/2003 | Bradski | 382/107 |
| 6,658,059 B1 | 12/2003 | Iu et al. | 375/240.16 |
| 6,665,423 B1 | 12/2003 | Mehrotra et al. | 382/107 |
| 6,678,413 B1 | 1/2004 | Liang et al. | 382/181 |
| 6,691,080 B1 | 2/2004 | Tachibana | 703/19 |
| 6,700,224 B2 | 3/2004 | Biskup et al. | 307/116 |
| 6,708,338 B1 | 3/2004 | Kim | 725/135 |
| 6,718,236 B1 | 4/2004 | Hammer et al. | 701/3 |
| 6,736,511 B2 | 5/2004 | Plummer et al. | 351/224 |
| 6,746,274 B1 | 6/2004 | Verfuerth | 439/505 |
| 6,788,809 B1 | 9/2004 | Grzeszczuk et al. | 382/154 |
| 6,807,290 B2 | 10/2004 | Liu et al. | 382/118 |
| 6,816,836 B2 | 11/2004 | Basu et al. | 704/270 |
| 6,829,373 B2 | 12/2004 | Piccinelli et al. | 382/107 |
| 6,845,130 B1 | 1/2005 | Han et al. | 375/240.16 |
| 6,858,003 B2 | 2/2005 | Evans et al. | 600/104 |
| 6,864,903 B2 | 3/2005 | Suzuki | 715/757 |
| 6,879,709 B2 | 4/2005 | Tian et al. | 382/118 |
| 6,898,243 B1 | 5/2005 | Alvarez | 375/240.14 |
| 6,911,995 B2 | 6/2005 | Ivanov et al. | 348/42 |
| 6,937,966 B1 | 8/2005 | Hellerstein et al. | 703/2 |
| 6,944,320 B2 | 9/2005 | Liu et al. | 382/118 |
| 6,950,537 B2 | 9/2005 | Liu et al. | 382/118 |
| 6,954,500 B2 | 10/2005 | Bottreau | 375/240.16 |
| 6,956,573 B1 | 10/2005 | Bergen et al. | 345/473 |
| 6,956,898 B1 | 10/2005 | Podilchuk et al. | 375/240 |
| 6,964,023 B2 | 11/2005 | Maes et al. | 715/811 |
| 6,965,414 B2 | 11/2005 | Haraguchi | 348/441 |
| 6,980,671 B2 | 12/2005 | Liu et al. | 382/118 |
| 6,980,820 B2 | 12/2005 | Sinnarajah et al. | 455/515 |
| 6,993,163 B2 | 1/2006 | Liu et al. | 382/118 |
| 7,020,305 B2 | 3/2006 | Liu et al. | 382/107 |
| 7,039,219 B2 | 5/2006 | Liu et al. | 382/107 |
| 7,043,075 B2 | 5/2006 | Gutta | 382/158 |
| 7,058,204 B2 | 6/2006 | Hildreth et al. | 382/103 |
| 7,065,233 B2 | 6/2006 | Liu et al. | 382/118 |
| 7,068,842 B2 | 6/2006 | Liang et al. | 382/181 |
| 7,082,212 B2 | 7/2006 | Liu et al. | 382/118 |
| 7,103,225 B2 | 9/2006 | Yang et al. | 382/225 |
| 7,110,569 B2 | 9/2006 | Brodsky et al. | 382/103 |
| 7,113,492 B2 | 9/2006 | Siemens et al. | 370/294 |
| 7,120,276 B1 | 10/2006 | Brady et al. | 382/107 |
| 7,133,540 B2 | 11/2006 | Liu et al. | 382/118 |
| 7,142,698 B2 | 11/2006 | Liu et al. | 382/118 |
| 7,149,250 B2 | 12/2006 | Drieux et al. | 375/240.15 |
| 7,149,329 B2 | 12/2006 | Liu et al. | 382/118 |
| 7,149,330 B2 | 12/2006 | Liu et al. | 382/118 |
| 7,158,658 B2 | 1/2007 | Liu et al. | 382/118 |
| 7,170,492 B2 | 1/2007 | Bell | 345/158 |
| 7,174,035 B2 | 2/2007 | Liu et al. | 382/118 |
| 7,181,051 B2 | 2/2007 | Liu et al. | 382/118 |
| 7,190,843 B2 | 3/2007 | Wei et al. | 382/274 |
| 7,194,126 B2 | 3/2007 | Konolige | 382/154 |
| 7,200,270 B2 | 4/2007 | Yamaguchi | 382/224 |
| 7,206,435 B2 | 4/2007 | Fujimura et al. | 382/117 |
| 7,209,588 B2 | 4/2007 | Liang et al. | 382/181 |
| 7,212,656 B2 | 5/2007 | Liu et al. | 382/118 |
| 7,227,526 B2 | 6/2007 | Hildreth et al. | 345/156 |
| 7,227,976 B1 | 6/2007 | Jung et al. | 382/103 |
| 7,447,334 B1* | 11/2008 | Jiang et al. | 382/103 |
| 2002/0049690 A1* | 4/2002 | Takano | 706/47 |
| 2002/0169773 A1 | 11/2002 | Penrod et al. | 1/1 |
| 2002/0186221 A1 | 12/2002 | Bell | 345/474 |
| 2003/0055410 A1 | 3/2003 | Evans et al. | 606/1 |
| 2004/0114219 A1 | 6/2004 | Richardson | 359/368 |
| 2004/0131254 A1 | 7/2004 | Liang et al. | 382/181 |
| 2004/0141635 A1 | 7/2004 | Liang et al. | 382/110 |
| 2004/0141636 A1 | 7/2004 | Liang et al. | 382/110 |
| 2004/0263622 A1 | 12/2004 | Dennis et al. | 348/143 |
| 2005/0047503 A1 | 3/2005 | Han et al. | 375/240.01 |
| 2005/0049048 A1 | 3/2005 | Wilder et al. | 463/42 |
| 2005/0084167 A1 | 4/2005 | Le Maguet | 382/239 |
| 2005/0089222 A1 | 4/2005 | Lee et al. | 382/168 |
| 2005/0099373 A1 | 5/2005 | Funfschilling et al. | 345/87 |
| 2005/0100096 A1 | 5/2005 | Ho | 375/240.16 |
| 2005/0105619 A1 | 5/2005 | Lee et al. | 375/240.16 |
| 2005/0111112 A1 | 5/2005 | Masuda | 359/696 |
| 2005/0125358 A1 | 6/2005 | Levin et al. | 705/59 |
| 2005/0125359 A1 | 6/2005 | Levin et al. | 705/59 |
| 2005/0140630 A1 | 6/2005 | Kikuchi et al. | 345/89 |
| 2005/0146607 A1 | 7/2005 | Linn et al. | 348/148 |
| 2005/0165667 A1 | 7/2005 | Cox | 705/35 |
| 2005/0174352 A1 | 8/2005 | Gabrani et al. | 345/501 |
| 2005/0177386 A1 | 8/2005 | Essa | 705/5 |
| 2005/0185823 A1 | 8/2005 | Brown et al. | 382/103 |
| 2005/0193007 A1 | 9/2005 | Cruz Lopez et al. | 1/1 |
| 2005/0196017 A1 | 9/2005 | Altherr et al. | 382/103 |
| 2005/0206611 A1 | 9/2005 | Ching et al. | 345/156 |
| 2005/0213037 A1 | 9/2005 | Abdullayev et al. | 351/221 |
| 2005/0219414 A1 | 10/2005 | Tsukinokizawa | 348/552 |
| 2005/0238032 A1 | 10/2005 | Hesse | 370/401 |
| 2005/0259733 A1 | 11/2005 | Le Maguet | 375/240.12 |
| 2005/0275728 A1 | 12/2005 | Mirtich et al. | 348/211.99 |
| 2006/0012675 A1 | 1/2006 | Alpaslan et al. | 348/51 |
| 2006/0048207 A1 | 3/2006 | Martin | 725/135 |
| 2006/0050146 A1 | 3/2006 | Richardson | 348/80 |
| 2006/0053066 A1 | 3/2006 | Sherr et al. | 705/26 |
| 2006/0064641 A1 | 3/2006 | Montogmery et al. | 715/723 |
| 2006/0072900 A1 | 4/2006 | Gan et al. | 386/68 |
| 2006/0092153 A1 | 5/2006 | Chu et al. | 345/211 |
| 2006/0093317 A1 | 5/2006 | Law et al. | 386/68 |
| 2006/0097451 A1 | 5/2006 | Callaway | 273/292 |
| 2006/0104543 A1 | 5/2006 | Schweng | 382/297 |
| 2006/0105310 A1 | 5/2006 | Mullin | 434/307 R |
| 2006/0114268 A1 | 6/2006 | Marxen | 345/629 |
| 2006/0121997 A1 | 6/2006 | Wimberly-Dyer | 472/136 |
| 2006/0126737 A1 | 6/2006 | Boice et al. | 375/240.16 |
| 2006/0126738 A1 | 6/2006 | Boice et al. | 375/240.16 |
| 2006/0136217 A1 | 6/2006 | Mullin | 704/270 |
| 2006/0146471 A1 | 7/2006 | Roberts | 361/151 |
| 2006/0164533 A1 | 7/2006 | Hsieh et al. | 348/317 |
| 2006/0204935 A1 | 9/2006 | McAfee et al. | 434/22 |
| 2006/0233440 A1 | 10/2006 | Lee et al. | 382/168 |
| 2006/0239658 A1 | 10/2006 | St. Hilaire | 386/125 |
| 2006/0245497 A1 | 11/2006 | Tourapis et al. | 375/240.16 |

| | | | |
|---|---|---|---|
| 2006/0274618 A1 | 12/2006 | Bourret | 369/53.1 |
| 2007/0002053 A1 | 1/2007 | Hill et al. | 345/443 |
| 2007/0019724 A1 | 1/2007 | Tourapis et al. | 375/240.12 |
| 2007/0035436 A1 | 2/2007 | Thompson et al. | 342/22 |
| 2007/0035615 A1 | 2/2007 | Kung | 348/14.08 |
| 2007/0036293 A1 | 2/2007 | Erhart et al. | 379/88.16 |
| 2007/0036434 A1 | 2/2007 | Saveliev | 382/173 |
| 2007/0041384 A1 | 2/2007 | Das et al. | 370/395.4 |
| 2007/0046670 A1 | 3/2007 | Hedrick et al. | 345/440 |
| 2007/0070243 A1 | 3/2007 | Zhu | 348/448 |
| 2007/0105610 A1 | 5/2007 | Anderson | 463/16 |
| 2007/0174010 A1* | 7/2007 | Bhat et al. | 702/66 |
| 2008/0166022 A1* | 7/2008 | Hildreth | 382/107 |

OTHER PUBLICATIONS

Saad, Ali; Mubarak Shah; A Lagrangian Particle Dynamics Approach for Crowd Flow Segmentation and Stability Analysis; Computer Vision Lab, University of Central Florida, Jun. 2007.

Davis, James W. and Bobick, Aaron T.; The Representation and Recognition of Action Using Temporal Templates; M.I.T. Media Laboratory Perceptual Computing Section Technical Report No. 402; IEEE Conference on Computer Vision and Pattern Recognition (CVPR, 1997).

Reynolds, Craig W.; Flocks, Herds, and Schools: A Distributed Behavioral Model; Computer Graphics, vol. 21, No. 4, Jul. 1987; pp. 25-34.

Bobick, Aaron F.; and Davis, James W.; The Recognition of Human Movement Using Temporal Templates; IEEE Transactions on Pattern Analysis and Machine Intelligence; vol. 23, No. 3, Mar. 2001; pp. 257-267.

Boyd, J.E., Hushlak, Geral, and Jacob, Christian J.; Swarm Art: Interactive Art From Swarm Intelligence, In proceedings of ACM Multimedia 2004, Oct. 10-16, New York, NY, 2004, p. 628-635.

Jacob, Christian J., Hushlak, Jeffrey E., Boyd, Maxwell, Paul Nuytten, and Pilat Sayles and Marcin.; SwarmArt: Interactive Art from Swarm Intelligence, Leonardo, vol. 40, No. 3, Jun. 2007; pp. 249-252.

Nguyen, Q. et al.; Motion Swarms: Video Interaction for Art in Complex Environments; proceedings of ACM Multimedia 06, Santa Barbara CA Oct. 24-26, 2006, p. 461-469.

* cited by examiner

Motion Swarm - Interaction with particles attracted to motion

METHOD AND SYSTEM FOR VIDEO INTERACTION BASED ON MOTION SWARMS

FIELD OF THE INVENTION

The present application relates to image processing, and more particularly to a method and system for generating an interactive video display.

BACKGROUND OF THE INVENTION

Event organizers often try to incorporate the audience into the event, for example, a concert, television show, sporting event. By engaging the audience, the organizers give people a sense of participation, reinforcing the notion that the audience is important to the event. In many cases, the mood of the audience can determine the success of an event. Therefore, many event organizers devise methods to engage an audience to keep them happy and entertained.

At sporting events, organizers typically try to engage their audiences. For example, mascots interact with the audiences and influence them to cheer for a team. Video screens cue audiences to clap and make noise. To further reinforce the event, video footage of the excited and cheering audience is often displayed on the video screens.

Video systems can provide a mechanism for interacting with art. While video systems may be inexpensive, easy to install, and typically impose few physical constraints, a public space presents a complex environment for video analysis systems. For instance, the number of people seen by a camera can vary from none to many. For instance, there may be motion in the background. In addition, light and weather conditions may vary. The clothing worn by members of the public subject of the video system may also vary. It will be appreciated that for effective interaction, a video system needs to accommodate these factors.

Interaction becomes even more difficult when the art is viewed by groups of people, for example, spectators at a sports event watching a video display while interacting with and manipulating the display with their movement or other motion. In this example, an interaction based video system must address the public space factors (as described above) in addition to scene complexity which arises from the number of people interacting (e.g. providing motion inputs) and the number of people not interacting.

Audience motion and behaviour is complex, and accordingly, there still remains a need for improvements in the art.

BRIEF SUMMARY OF THE INVENTION

The present invention comprises a video based system and method for interacting with art in a public space and is suitable for multiple participates, observers or an audience.

According to one aspect, the system comprises a model-free and appearance based mechanism, i.e. parameters that describe the field of motion presented to the system are extracted independently of any object-specific knowledge related to the scene. According to another aspect, the system comprises a mechanism for imposing some structure upon the field of motion to handle motion. According to one aspect, the mechanism comprises a particle swarm that is responsive, e.g. moves, in reaction to the motion field. According to another aspect, the mechanism comprises placing constraints on the movement of particles to further structure the motion field.

According to one embodiment, the present invention comprises a method for video interaction, the method comprising the steps of: generating a motion field; simulating motion of a particle in the motion field; inputting an input associated with one or more participants; generating an interaction based on the simulated motion of the particle and the input associated with one or more of the participants.

According to another embodiment, the present invention comprises a system for providing interaction between one or more participants and an image display, the system comprises: a video capture device configured to capture a scene including the one or more participants; a module configured to extract one or more parameters associated with a field of motion in the scene, wherein the field of motion is associated with the one or more participants; a module configured to modify the scene in response to the field of motion; and a module configured to generate an image on the image display based on the scene as modified by the field of motion.

According to yet another embodiment, the present invention provides a method for rendering motion in a video scene, the method comprises the steps of: detecting a motion field in the video scene; providing a swarm in the video scene; subjecting the swarm to the motion field; and rendering the swarm in reaction to the motion field.

According to a further embodiment, the present invention provides a system for rendering motion in a video scene, the system comprises: a control module configured to detect a motion field in the video scene; a control module configured to generate a plurality of particles in the video scene, and the plurality of particles comprising a swarm; a control module configured to apply a force derived from the motion field to the swarm of particles; and a control module configured to render the reaction of the swarm of particles to the motion field.

Other aspects and features according to the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments according to the present invention, and in which.

Like reference numerals indicate like or corresponding elements in the drawings.

DETAILED DESCRIPTION OF THE EMBODIMENTS

Figure 1:
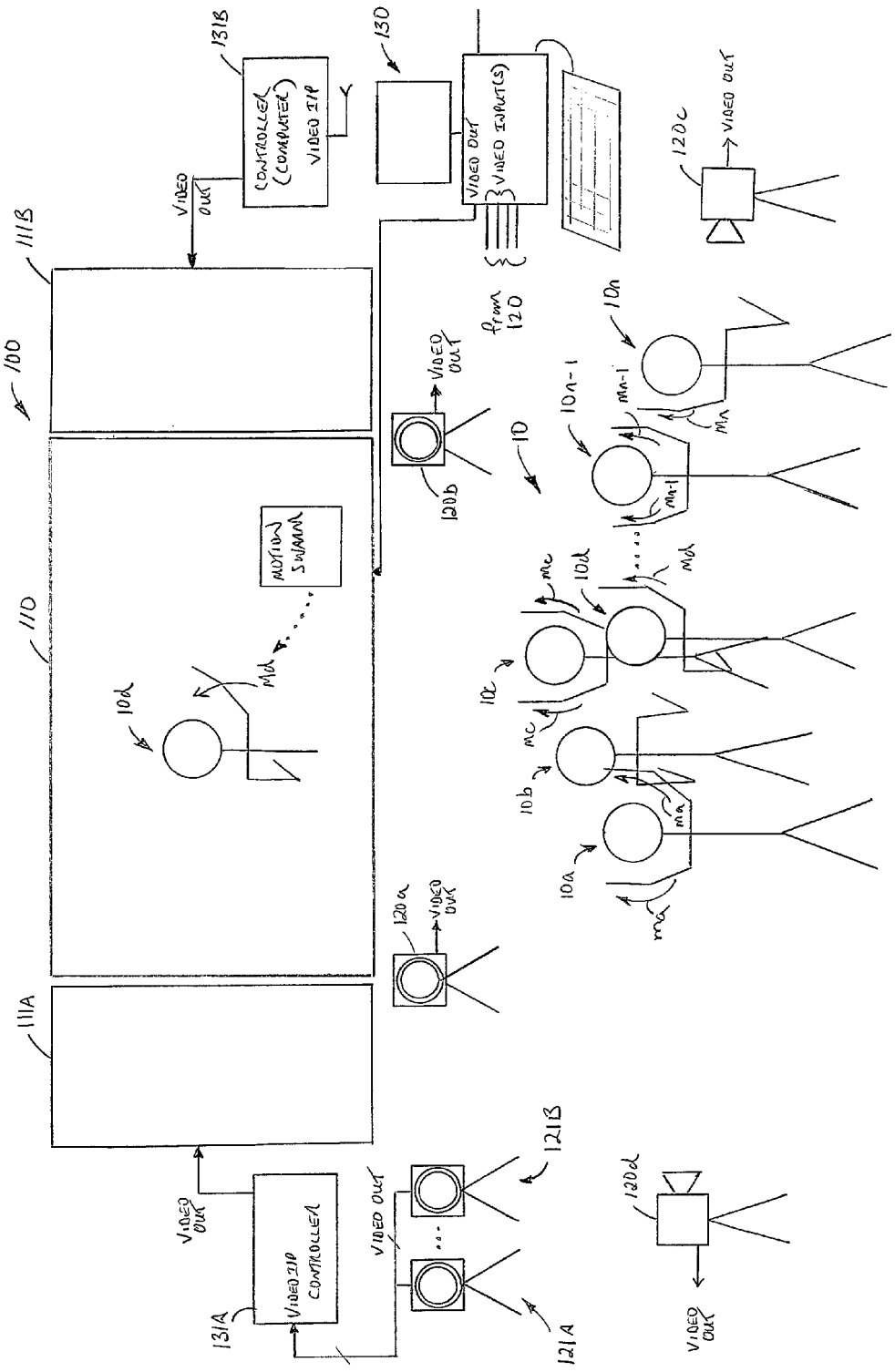
FIG. 1 shows in diagrammatic form a system for generating an interactive video display according to an embodiment of the present invention.

Reference is first made to FIG. 1, which shows in diagrammatic form a system for generating an interactive video display or image according to an embodiment of the invention and indicated generally by reference 100. As shown, the system 100 comprises a display screen 110, one or more image input devices 120 and a computer system indicated generally by reference 130. The image input devices 120, indicated individually by references 120a, 120b, 120c and 120d, may comprise a video camera and any other types of image capture or input devices. Each of the image input devices 120 provides a video output which is fed to or inputted by the computer system 130. The image input devices 120 and the computer system 130 may be implemented in known manner as will be within the understanding of one skilled in the art.

As shown in FIG. 1, the image input devices 120, e.g. one or more video cameras, are aimed or focused on an audience comprising one or more members, i.e. observers and/or participants indicated generally by reference 10. The participants or members 10, indicated individually by references 10a, 10b, 10c, 10d ... 10n-1 and 10n, may comprise attendees at sporting event (for example, a hockey game or a football game) or people standing in front of a store front display having a video display monitor. As will be described in more detail below, the system 100 provides the capability for the participants to interact with an image or scene captured by the image input device(s) 120 and the result of interaction of the participant(s) is displayed in the form of one or more images on the display screen 110. The interaction may take a number of different forms. For example, as depicted in FIG. 1, participants 10a, 10c and 10n-1 have raised both arms, as indicated by references Ma, Mc and Mn-1, respectively, and participants 10d and 10n have raised only one arm, as indicated by references Md and Mn, respectively. As will be described in more detail below, the movement (or actions) of the participants 10 results in a motion field which is then applied to one or more swarms of image particles. The swarms of image particles comprise a mechanism which is responsive to the motion field and an image is generated based on the interaction of the motion field and the image is displayed on the display screen 110 for viewing by the participants or other members.

According to another embodiment, the system 100 may comprise one or more additional screens, for example, as denoted by references 111A and 111B in FIG. 1. According to another aspect, the system 100 may include one or more additional computing devices or controllers, for example, as denoted by references 131A and 131B in FIG. 1. According to one embodiment, the computers 131A and 131B are coupled to the respective display screens 111A and 111B. The computers 131A and 131 are configured to coordinate with the computer 130, for example, via software and/or a networked configuration to display the image over the multiple screens 110 and 111. According to another embodiment, the computers 131A and 131B receive video feed(s) from additional video input devices 121A and 121B. According to another embodiment, the computers 131A and 131B are coupled to respective display screens 111A and 111B and video feed(s) are provided by one or more of the video input devices 120.

In accordance with one aspect, the computer system 130 comprises a controller, or controller modules or components, which is configured to perform and provide the functionality as described in more detail below. The configuration may comprise the controller executing one or more computer programs, software modules, code components or objects configured to provide the functionality as described below.

According to one aspect, the system 100 comprises a video system providing for interaction with participants, e.g. an audience in a public place. The image input device(s) 120 capture a scene, e.g. images of the participants, and the computer system 130 is configured to define a field of motion in the scene and extract one or more parameters that describe the field of motion. The computer system 130 is configured to generate a swarm of particles that is responsive to the motion field. The motion field may comprise movements or actions performed by one or more of the participants. The parameters describing the motion field are then applied to the swarm of particles and the swarm responds to the motion field. The response, e.g. movement, of the swarm of particles is displayed to the audience giving the audience a view of the scene with the resulting participant interaction. According to another aspect, the computer system 130 is configured to generate one or more constraints that may be placed on the swarm of particles to control the response of the swarm.

According to an embodiment, the motion swarm mechanism comprises one or more swarms of particles that are responsive, e.g. move, to a field. The field is generated or based on a motion history image or MHI. The motion history image (MHI) in known manner provides a representation of a field of motion that is independent of the number of people in the scene or the complexity of the scene.

In a motion intensity field the pixels indicate how recently a pixel has changed in intensity. For instance, brighter pixels comprise pixels that have changed more recently, and darker pixels comprise pixels that have not changed. In the context of the present application, changes in intensity are due to motion.

Let $T_k(x)$ comprise a binary image that indicates whether a pixel at $x=[x, y]^T$ changed significantly in a video frame k. The binary image $T_k$ can be computed using adaptive background subtraction, for example, as follows:

$$T_k = \begin{cases} 1 & |I_k(x) - \tilde{I}_k(x)| \geq \tau \\ 0 & \text{otherwise} \end{cases} \quad (1)$$

where $I_k$ is the image at time k, $\tilde{I}_k$ is I smoothed in time, and $\tau$ is a threshold that determines what intensity change is significant. The temporal smoothing of I over a wide time window allows the background to adapt to slow changes in scene illumination. A recursive, infinite impulse response (IIR) filter allows for computationally efficient smoothing over broad temporal windows.

The motion history image (MHI) at time k is determined according to a function $M_k(x)$ as follows:

$$M_k = \max(cT_k(x), M_{k-1}(x)-1) \quad (2)$$

Where $cT_k(x) \in \{0, c\}$. Accordingly, when a pixel changes, the corresponding pixel in the MHI is set to c, otherwise, the value is decremented, never going below zero. In this way, the constant, c, sets the persistence of the motion history.

In order to have the swarm particles respond in a more natural or predictable manner, the function $M_k(x)$ for determining the motion history image is "smoothed" as follows:

$$\tilde{M}_k(x) = M_k(x) \otimes G(x; \sigma) \quad (3)$$

where $\otimes$ indicates convolution and G is a Gaussian kernel. It will be appreciated that this operation also serves to broaden the basin of attraction for particles as described in more detail below. In accordance with one aspect, a large value is selected for $\sigma$ (for example, in the range of 10%), and a recursive filter is utilized to provide a computationally efficient implementation for arbitrary values of $\sigma$.

It will be appreciated that in public places or with large audiences the motion field can be quite complex. According to another aspect, the motion history image or MHI is treated like a field and the gradient of the MHI is translated into a force that acts on the particles comprising the swarm.

According to one embodiment, the function $x_k=[x,y]^T$ defines the position of a particle, the function $v_k=[v_x,v_y]^T$ defines the velocity of a particle, and the function $p_k=[p_x,p_y]^T$ gives the momentum of a particle at time interval $_k$. The following equations may be used to simulate movement of a particle in response to a force F acting on it:

$$x_k = x_{k-1} + v_{k-1}\Delta t, \quad (5)$$
$$p_k = p_{k-1} + F_k(x)\Delta t, \text{ and}$$
$$v_k = \frac{p_k}{m},$$

where $\Delta t$ is the time sample interval and m is the particle mass. In accordance with an embodiment, the particles forming the swarm comprise points with no mass, and m is treated as a tunable constant.

Accordingly, for a particle at position x, the force due to the motion field is $$F_{M_k} = \nabla \tilde{M}(x) \approx \frac{1}{2}\begin{bmatrix} \tilde{M}_k([x+1, y]^T) - \tilde{M}_k([x-1, y]^T) \\ \tilde{M}_k([x, y+1]^T) - \tilde{M}_k([x, y-1]^T) \end{bmatrix} \quad (6)$$

If $F=F_{M_k}$, then the particles will tend to move up the gradient of the motion history image (MHI). Since the brightest pixels in the motion history image represent the most recent occurrence of motion, particles in the swarm will tend to follow the motion. In another embodiment, the force can be changed to repel the particles, for example, by setting m<0, or letting $F=-F_{M_k}$.

According to another aspect, the system 100 provides the capability to introduce other or additional forces which can act on particles or the swarm particles. For example, in a manner similar to that described above for the motion intensity field or MHI. The forces may comprise friction and forces arising from the interaction of neighboring particles or particles in a neighboring region, as described in more detail below.

According to one aspect, the computer system 130 is configured (e.g. under the control of a computer program or software) to introduce a frictional force that acts on particles in the swarm. It will be appreciated that without friction, particles in the swarm will continue to accelerate and move faster and faster every time the motion field is encountered. The frictional force acts in opposition to the velocity of the particle and provides the capability to slow down the particles and to prevent particles from "shooting past" regions of motion, for example, if the particle motion is too high.

According to another aspect, the computer system 130 is configured to introduce limits on the momentum of particles. It will be appreciated that particles that move too fast are not conducive to interaction with the audience, i.e. it is difficult for people to keep up with them. According to an embodiment an upper limit and/or a lower limit is placed on the magnitude of the particle momentum. The upper limit or bound prevents the particle from moving too fast, and the lower bound prevents the particle from coming to a complete stop.

According to another aspect, the computer system 130 is configured to generate a "bounding box". The bounding box provides a defined region or area within which the particles are allowed to move. According to one embodiment, the bounding box corresponds to the size of the image displayed, for example, on the display unit 110 (FIG. 1). According to another embodiment, bounding boxes are generated to define sub-images of interest. For example, in an interactive game between two groups of people, the computer system 130 is configured to generate a bounding box for the image region corresponding to each group. An example application of a bounding box is described in further detail below for the interactive "Hockey" simulation.

According to one aspect, the computer system 130 is configured to generate one or more "anchors" or "anchoring forces". An anchor defines a position for a particle and the application of a force can be used to propel the particle to the anchor position. For example, a plurality of anchors can be used to distribute particles throughout an image. Without the anchors, the particles can simultaneously follow motion to one part of the image and leave large portions of the image unsampled, and therefore unavailable for interaction. According to one embodiment, the anchoring force is modeled by the system as a spring between the center position and the particle.

It will be appreciated that each of these mechanisms, i.e. friction, momentum limit(s), bounding box, and anchor points comprise tunable parameters in the system 130. Tuning the parameters can alter the behavior of the particles or the swarm and this in turn can alter the nature of the interaction with the audience or participants.

Reference is next made to FIGS. 2 to 5 which further illustrate the operation and implementation of aspects of the system 100 in accordance with various embodiments.

Figure 2:
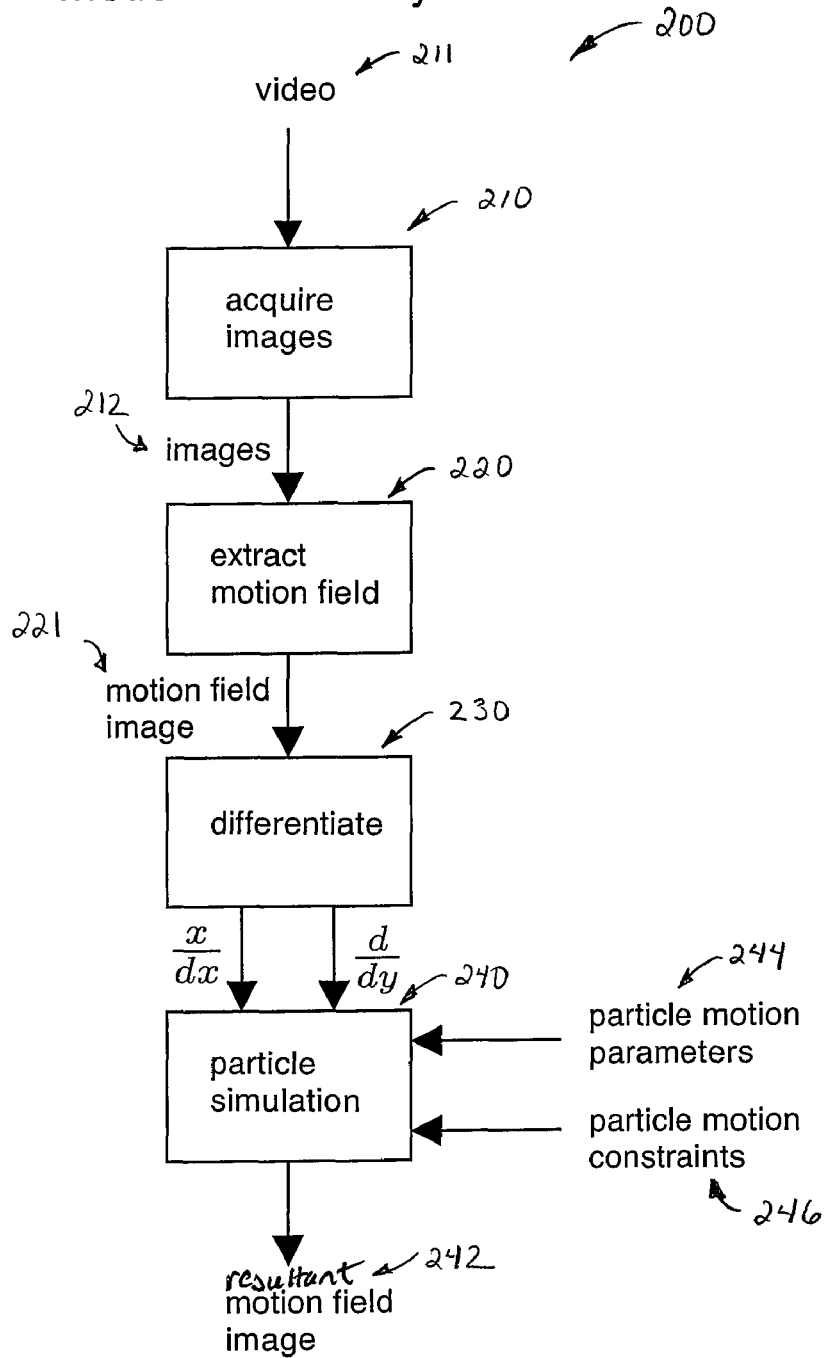
FIG. 2 shows in flowchart form a method for generating an interactive video image according to an embodiment of the present invention.

FIG. 2 shows in flowchart form a process for generating an image based on participant interaction. The process is indicated generally by reference 200. The first step in the process 200 as indicated by reference 210 comprises acquiring one or more images 212 of a scene. The images may be acquired from a video output 211 generated by one or more of the image capture devices 120 (FIG. 1). The captured images 212 are then processed by a module configured to extract a motion field image 221 as indicated by block 220. The motion field represents one or motion elements present in the captured images 212. The motion elements can be the result of movement by any one of a number of participants present in the scene and/or movement of an object (e.g. a ball) in the scene. For example, a motion element can comprise the participant 10a in FIG. 1 raising both arms Ma. The captured image comprises pixels and according to an embodiment as described above, motion in an image is determined by detecting changes in the intensity of the pixels. As shown, motion in the extracted motion field image 221 is determined by applying a differentiation function in block 230. According to an embodiment, the differentiation function 230 determines force on an "x" and "y" coordinate basis. The force is applied to a plurality or swarm of particles to produce motion. The next step as indicated by reference 240 comprises a particle simulation which involves subjecting the particles or swarm to motion inputs and/or motion constraints, indicated generally by references 244 and 246, respectively. The motion inputs 244 may comprise inputs from other participants and the motion constraints may comprise friction forces, momentum limiters, bounding box definitions and other parameters as described above. The particle simulation operation 240 results in a motion field image 242 which can then be displayed on a display screen (for example, the display screen 110 in FIG. 1). According to an embodiment, the motion field image 240 may comprise an overlay which displayed together with another image of the scene.

Figure 3:
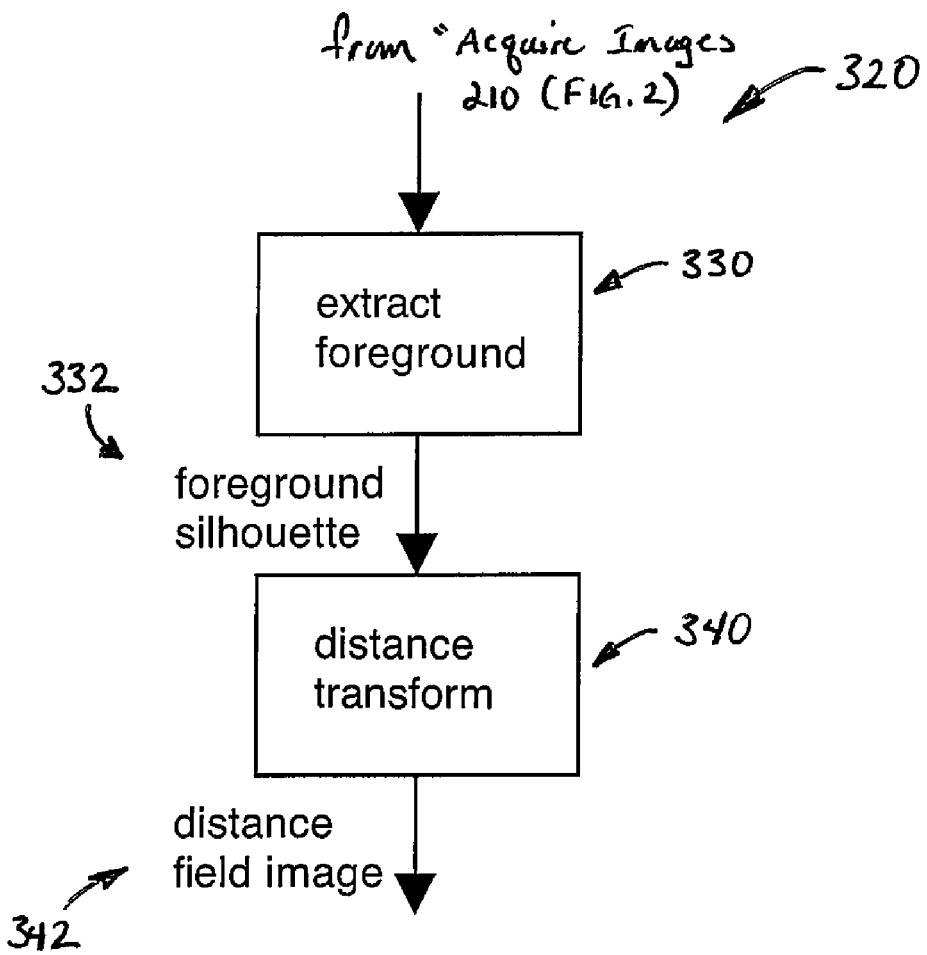
FIG. 3 shows in flowchart form a method for extracting a motion field according to an embodiment of the present invention.

Reference is next made to FIG. 3, which shows a process for extracting a motion field according to another embodiment. The process of extracting a motion field is indicated generally by reference 320 and is implemented to be executed after the acquire images step 210 (FIG. 2). As shown, the first step involves executing a module configured to extract foreground data from the acquired images 212 (FIG. 2) and produce a foreground silhouette indicated generally by reference 332. The next step involves executing a module configured to apply a distance transform to the foreground silhouette 332 as indicated by reference 340. The output of the distance transform module 340 is a distance field image 342 which is then available for further processing as described above with reference to FIG. 2.

Figure 4:
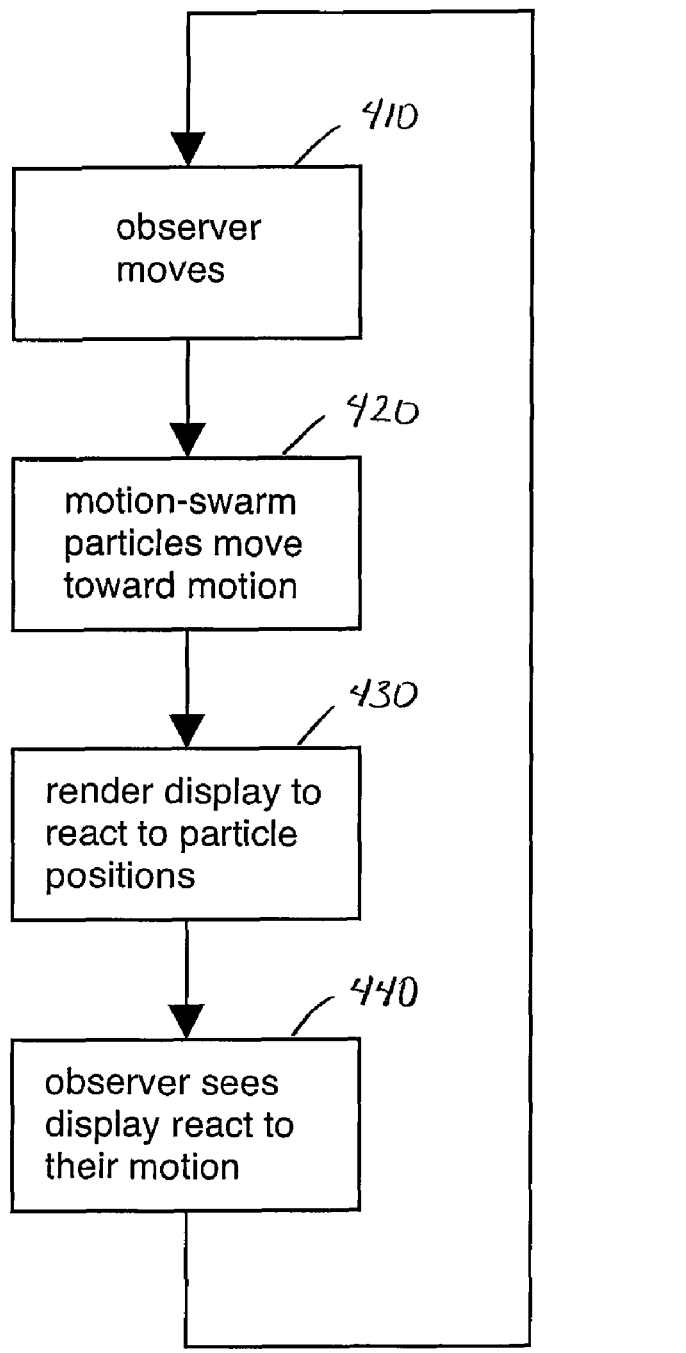
FIG. 4 shows in flowchart form a method for interacting with a motion swarm of particles attracted to motion, according to an embodiment of the present invention.

Reference is next made to FIG. 4, which shows a process for interacting with particles (i.e. a motion swarm) attracted to motion. The process is indicated generally by reference 400 and involves reacting to the motion of an observer (e.g. a participant 10 in FIG. 1) present in the scene and moving a swarm of particles toward the motion of the observer. The swarm of particles can comprise any form of visible object or graphic, for example, an arrow, a cartoon character, etc. As shown, the first step involves executing a module (for example, in software) configured to detect movement of the observer as indicated by reference 410. The next step involves executing a module configured to move the swarm of particles toward the motion of the observer (i.e. in reaction to the motion of the observer) as indicated by reference 420. The motion of the observer is determined, for example as described above, and the swarm of particles is attracted to, i.e. moves towards, the observer by using an anchor and a bounding box for swarm. The next step involves executing a module configured to render a display or image showing the movement of the particle swarm, i.e. the reaction of the particle swarm to the observer's motion, as indicated by reference 430. As described above, the movement of the particle swarm can be further controlled by applying constraints such as momentum limit(s) and/or a friction parameter. The next step involves executing a module configured to display the rendered image on a display screen as indicated by reference 440, and for example as depicted in FIG. 1 on the display screen 110. This allows the observer to see his/her interaction in the scene and in response make additional movements to change or repeat the interaction.

Figure 5:
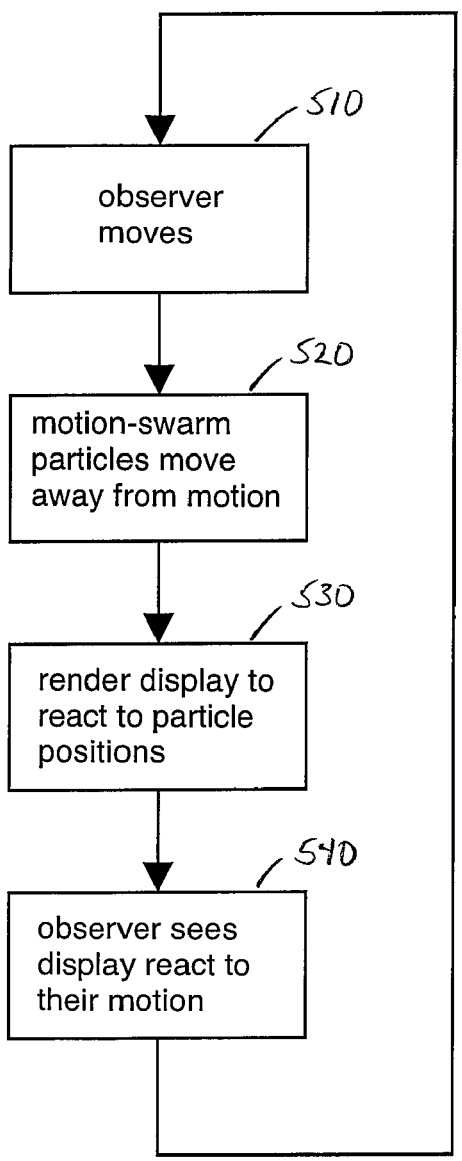
FIG. 5 shows in flowchart form a method for interacting with a motion swarm of particles repelled by motion, according to an embodiment of the present invention.

Reference is next made to FIG. 5, which shows another process for interacting with an image where the particles (i.e. a motion swarm) are repelled by motion. The process is indicated generally by reference 500 and involves tracking the motion of an observer (e.g. a participant 10 in FIG. 1) present in the scene and moving a swarm of particles away from the observer in reaction to the motion. With reference to FIG. 5, the first step involves executing a module (for example, in software) configured to detect movement of the observer as indicated by reference 510. The next step involves executing a module configured to move the swarm of particles away from the observer in reaction to the motion, as indicated by reference 520. The next step involves executing a module configured to render a display or image showing the movement of the particle swarm, i.e. the reaction of the particle swarm to the observer's motion, as indicated by reference 530. As described above, the movement of the particle swarm can be further controlled by applying constraints such as momentum limit(s) and/or a friction parameter. The next step involves executing a module configured to display the rendered image on a display screen as indicated by reference 540. Upon the observer to seeing his/her interaction in the scene, he or she may make additional movements to change or repeat the interaction.

The processes for generating and manipulating an interactive image as described above may be implemented in a computer program or software modules or objects as will be within the understanding to one skilled in the art. For example, according to one embodiment, the system is implemented in two modules: a video processing module and an artistic display module. The video processing module is implemented, for example, in Python and utilizes C- and assembly-based libraries to perform the fast inner-loop computations for the video processing and other related processing functions described above. According to one embodiment, the video processing module runs on a computer configured as a video server (for example, the computer 130 in FIG. 1). The video server is configured in a network with one or more other computers and exchanges XML documents and image data using HTTP protocol. In the context of the present application, the server is configured to broadcast or communicate source video, motion history image (MHI) data, and/or XML documents containing position information for the particles. The artistic display module is configured to run on or more computers networked with the server (for example, the computers 131 connected to the computer 130 via a network). The artistic display module is configured to communicate with the video server to acquire images and particle positions. According to one embodiment, the artistic display module includes a Breve™ simulation or a Quartz Composer™ software module for rendering the particles into swarm(s) for visualization. The artistic display module is configured (e.g. includes code components or modules) to allow the Breve™ simulation module to interact with the video processing module, such as receiving and reading XML documents from the video server. The Quartz Composer™ module is configured and used to provide three-dimensional image rendering. According to this aspect, the artistic display module renders a particle swarm for display which has been subjected to the motion field as described above. It will be appreciated that the mechanism or software/code modules for generating a swarm of particles may be implemented using other techniques.

Utilizing the system and techniques according to the present invention, the following audience interactive simulations may be performed.

"Music"—the simulated interaction allows an audience to produce music. According to the simulation, the audience is presented with an image of themselves, which is reversed left-to-right to give the effect of a mirror. The system is configured to superimpose upon the image a band (e.g. a blue band) at the top of the image and a set of balls (e.g. green balls). The balls are generated to correspond to the positions of particles generated/simulated by the video processing system. The system is configured to generate a force that repels the balls/particles. According to the simulation, the balls are propelled or moved around the display as members of the audience waves their hands or swats at the balls. The band at the top of the display is configured to operate as a virtual keyboard. When a ball hits the band, the keyboard plays music and the audience is provided with the sounds they generate. According to one embodiment, the sound generation function in the Breve simulation software may be used to generate the sounds in accordance with the simulation.

"Volleyball"—the simulated interaction involves an audience moving a ball back and forth as in a volleyball game. According to the simulation, the audience is presented with a mirror image of themselves on the display screen. Superimposed on the display is a single ball, and the system is configured to attract the ball to motion. As the ball moves, the audience sees that their image is rendered on a surface that moves with the ball. A tail flowing behind the ball is generated to emphasize the motion of the ball.

"Hockey"—the audience is presented with a display showing the names of rival hockey teams arranged in two columns. For each hockey team, four copies of the team logo are displayed below the name. In response to members of the audience moving, the system is configured to move the logos and according to one embodiment the system is configured to repel the logos in response to motion. According to the simulation, as the logos move, a brilliantly coloured tail is generated and the team name is pulsed on the display. In this simulation, the audience is able to engage in a sort of competition where the object is to make their team name and logo the most animated. The system is configured to generate a motion particle for each logo, and the motion of the particle is constrained by a bounding box, for example, movement of the logo is constrained to one side or region/area of the display. For this simulation, the system is also configured to generate an anchor for each of the logos, for example, to maintain coverage of the audience.

"Spray Paint"—the audience is presented with an image of themselves on the display screen with one or more (e.g. three) superimposed balls. The system is configured so that the balls follow the motion of particles, and the balls function as virtual spray cans, i.e. spray painting the image of the audience appearing on the display screen. The particles respond or react to motion inputs (for example, from members of audience moving their arms or standing up) and the resulting motion of the particles is tracked by the balls to spray paint the image. According to one embodiment, where the balls are present, the video image is spray painted, and where the balls are not present the image is frozen, i.e. it appears as when last sprayed (or not sprayed).

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for video interaction, said method comprising the steps of:
   capturing an image of a scene with an image capture device, the scene including a movement of a participant;
   generating, in a processing device, a motion field comprising one or more parameters describing the movement of the participant in the scene;
   simulating motion of a particle that is responsive to the motion field;
   applying the one or more parameters of the motion field to the particle, such that the particle is responsive to the one or more parameters;
   generating, using the processing device, an interaction based on the simulated motion of said particle and the movement of the participant.

2. The method as claimed in claim 1, wherein said step of simulating motion of a particle comprises modeling one or more forces associated with said motion field.

3. The method as claimed in claim 2, wherein said forces comprise an attraction force.

4. The method as claimed in claim 1, further including the step of bounding the motion of said particle.

5. The method as claimed in claim 1, further including the step of providing an anchor point and anchoring the motion of said particle to said anchor point.

6. The method as claimed in claim 2, wherein said forces comprise a repel force.

7. The method as claimed in claim 2, wherein said forces comprise a friction force.

8. The method as claimed in claim 7, further comprising tuning the motion of the particle through modification of the friction force.

9. The method as claimed in claim 8, further comprising adjusting a friction coefficient in a model of the friction force to tune the motion of the particle.

10. The method as claimed in claim 1, wherein simulating motion of the particle further comprises calculating a momentum value associated with the particle.

11. The method as claimed in claim 10, wherein the momentum value is tunable in response to an adjustment to a mass value associated with the particle.

12. The method as claimed in claim 4, wherein bounding the motion of said particle comprises applying a bounding box defining a restricted space for movement of the particle.

13. The method as claimed in claim 12, further comprising tuning a parameter associated with the bounding box to modify movement of the particle.

14. The method as claimed in claim 5, further comprising providing a plurality of anchor points distributed throughout an image associated with the scene.

15. The method as claimed in claim 14, such that a plurality of particles may be distributed throughout the image and available for interaction with participants in different portions of the scene.

16. The method as claimed in claim 5, wherein a force exerted by the anchor point on the particle is modeled as a spring force between the anchor point and the particle.

17. The method as claimed in claim 16, wherein the force exerted by the anchor point on the particle is tunable.

18. The method as claimed in claim 17, further comprising adjusting a spring constant in a model of the spring force associated with the anchor.

19. The method as claimed in claim 1, wherein the motion field is generated in response to a Motion History Image (MHI).

20. The method as claimed in claim 1, wherein generating the motion field further comprises identifying a change in an intensity of a pixel in the image captured of the scene.

* * * * *